United States Patent
Kishibata et al.

(10) Patent No.: US 6,843,753 B2
(45) Date of Patent: Jan. 18, 2005

(54) VEHICLE DRIVEN BY INTERNAL COMBUSTION ENGINE HAVING GENERATOR

(75) Inventors: Kazuyoshi Kishibata, Numazu (JP); Yuichi Kitagawa, Numazu (JP); Hiroyasu Sato, Numazu (JP)

(73) Assignee: Kokusan Denki Co., Ltd., Shizuoka-ken (JP)

(*) Notice: Subject to any disclaimer, the term of this patent is extended or adjusted under 35 U.S.C. 154(b) by 34 days.

(21) Appl. No.: 10/458,459

(22) Filed: Jun. 10, 2003

(65) Prior Publication Data

US 2004/0005955 A1 Jan. 8, 2004

(30) Foreign Application Priority Data

Jul. 4, 2002 (JP) .................................. 2002-195930
Apr. 17, 2003 (JP) .................................. 2003-113110

(51) Int. Cl.$^7$ ........................................... B60K 41/28
(52) U.S. Cl. ........................ 477/91; 477/39; 477/906
(58) Field of Search ........................ 477/90, 91, 107, 477/110, 906, 37, 39, 44

(56) References Cited

U.S. PATENT DOCUMENTS 4,603,602 A * 8/1986 Tanaka et al. ............... 477/49
6,054,776 A * 4/2000 Sumi ............................ 290/17
6,533,693 B2 * 3/2003 Bowen et al. ................ 475/5
6,651,759 B1 * 11/2003 Gruenwald et al. ......... 180/65.2
6,722,230 B2 * 4/2004 Sakamoto et al. ............. 74/661

FOREIGN PATENT DOCUMENTS

JP 2001-231106 8/2001

* cited by examiner

Primary Examiner—Sherry Estremsky
(74) Attorney, Agent, or Firm—Pearne & Gordon LLP (57) ABSTRACT

A vehicle driven by an internal combustion engine incorporating a power supply unit and including a power transmission on/off determination device that gradually opens a throttle valve of the engine to gradually increase a rotational speed of the engine, detects, as a determination value that reflects a load applied on the internal combustion engine when the speed of the engine increases to a power transmission start rotational speed, and then the throttle valve is further opened by a set angle, determines that the power transmission device is in a state of cutting the power transmission when it is determined from the determination value that the engine load is less than a preset magnitude, and determines that the power transmission device is in a state of performing the power transmission when it is determined from the determination value that the engine load is equal to or more than the preset magnitude.

25 Claims, 6 Drawing Sheets

VEHICLE DRIVEN BY INTERNAL COMBUSTION ENGINE HAVING GENERATOR

TECHNICAL FIELD OF THE INVENTION

The present invention relates to a power transmission on/off determination device that determines whether a power transmission device of a vehicle driven by an internal combustion engine incorporating a power supply unit that uses a generator driven by an internal combustion engine to supply power to a load when the vehicle is stopped is in a state of performing power transmission, or a state of cutting the power transmission, and a vehicle driven by an internal combustion engine including the power transmission on/off determination device.

BACKGROUND OF THE INVENTION

In recent years, vehicles driven by an internal combustion engine such as ATVs (All Terrain Vehicles), tractors, or recreation vehicles that are driven vehicles intended mainly for driving on rough ground have been incorporating a power supply unit that uses a generator driven by an internal combustion engine for driving a vehicle as a power supply to generate a commercial AC output of AC 100 V, AC 200 V (50 Hz or 60 Hz), or the like when the vehicle is stopped, in order to allow electric tools or home appliances to be used outdoors. Such a vehicle often uses a power transmission device that is provided between an internal combustion engine and drive wheels, includes a continuously variable transmission (CVT) having a gear position for cutting power transmission, and an automatic clutch mechanism such as a centrifugal clutch, and starts the power transmission when a rotational speed of the engine reaches a predetermined power transmission start rotational speed (a rotational speed at which the automatic clutch mechanism starts the power transmission) or higher.

When the vehicle driven by the internal combustion engine incorporating the power supply unit uses the power transmission device as described above, the gear position of the power transmission device is in a position other than a neutral position or a parking position at the time of generation. If the rotational speed of the engine is increased to a rotational speed at which a generator generates a predetermined output, with power transmission being performed via the power transmission device, the clutch may be connected to start the vehicle.

In order to prevent this, as disclosed in, for example, Japanese Patent Application Laid-Open No. 2001-231106, such a vehicle driven by an internal combustion engine has a gear position sensor that detects a gear position of a power transmission device, and only when the gear position sensor detects that the gear position is in a position for cutting power transmission, speed control means which controls a rotational speed for generating electric power.

However, even with such a construction, if a failure of the gear position sensor, or a failure of the power transmission device causes the gear position sensor to detect by mistake that the power transmission is cut in spite that the power transmission device is in a state of performing the power transmission, the speed control means controls the speed, and thus a possibility of runaway of the vehicle at the time of generation cannot be completely eliminated.

In order to solve this problem, it is preferable to determine whether the power transmission device is in the state of cutting the power transmission, or the state of performing the power transmission (determine on/off of the power transmission) independently of the gear position sensor.

SUMMARY OF THE INVENTION

Therefore, an object of the invention is to provide a vehicle driven by an internal combustion engine that has a function of accurately determining whether a power transmission device is in a state of cutting power transmission, or a state of performing the power transmission independently of a gear position sensor.

Another object of the invention is to provide an on/off determination device of a power transmission device for a vehicle driven by an internal combustion engine that can accurately determines whether the power transmission device is in a state of cutting power transmission, or a state of performing the power transmission independently of a gear position sensor.

The invention is applied to a vehicle driven by an internal combustion engine including: an internal combustion engine provided for driving a vehicle; a power transmission device that is provided between a crankshaft of the internal combustion engine and drive wheels of the vehicle, and enters a state of transmitting power from the internal combustion engine to the drive wheels when a rotational speed of the internal combustion engine reaches a predetermined power transmission start rotational speed or higher; and a power supply unit that uses a generator driven by the internal combustion engine as a power source to supply electric power to a load when the vehicle is stopped.

There are provided in the invention: valve control means for on/off determination which controls means for operating a valve that adjusts an intake air amount of the internal combustion engine so as to gradually increase an opening degree of the valve when an instruction to start the generator is provided; determination value detection means for detecting, as a determination value, a value that reflects a magnitude of a load applied on the internal combustion engine when the rotational speed of the internal combustion engine reaches the power transmission start rotational speed in a process where the valve control means for on/off determination gradually increases the opening degree of the valve, and then, when the opening degree of the valve is further increased by a set angle that is preset within a range so as not to start the vehicle; and determination means for determining that the power transmission device is in a state of cutting power transmission when it is determined from the determination value that the load applied on the internal combustion engine is less than a preset determination reference load, and determining that the power transmission device is in a state of performing the power transmission when it is determined from the determination value that the load applied on the internal combustion engine is equal to or more than the determination reference load.

If the opening degree of the valve that adjusts the intake air amount of the engine is gradually increased from a state where the internal combustion engine is idling, the power transmission is started when the rotational speed of the engine reaches the power transmission start rotational speed. At this time, the valve that adjusts the intake air amount is further opened by the set angle small enough to prevent the vehicle from starting. Then, if a gear position of a transmission of the power transmission device is in a position for performing the power transmission, the load of the internal combustion engine significantly increases, but if the gear position is in a position for cutting the power transmission, the load of the internal combustion engine changes little.

Thus, as described above, the value that reflects the magnitude of the load applied on the internal combustion engine when the rotational speed of the internal combustion engine reaches the power transmission start rotational speed in the process where the opening degree of the valve that adjusts the intake air amount is gradually increased, and then when the valve is further opened by the set value, is detected as the determination value to determine from the determination value whether or not a predetermined load is applied on the internal combustion engine, thus allowing detection of whether the power transmission device is in the state of cutting the power transmission, or the state of performing the power transmission independently of the gear position sensor.

This method allows an on/off state of the power transmission device to be accurately detected even if a failure of the gear position sensor, or a failure of the transmission of the power transmission device prevents the gear position sensor from accurately detecting the on/off state of the power transmission device.

"The value that reflects the magnitude of the load applied on the internal combustion engine" used as the determination value may be any value that indicates a detectable change when the load applied on the internal combustion engine such as the rotational speed or pressure within an intake pipe of the engine changes.

In the invention, it is preferable to provide safety means for stopping the internal combustion engine, or returning the rotational speed of the internal combustion engine less than the power transmission start rotational speed when the determination means determines that the power transmission device is in the state of performing the power transmission.

The safety means can prevent the power supply unit from being operated to start the vehicle, with the power transmission device being in the state of performing the power transmission, thus increasing safety of the vehicle driven by the internal combustion engine incorporating the power supply unit.

When the safety means is provided as described above, it is preferable to further provide alarm raising means for raising an alarm of abnormality in the power transmission device when the determination means determines that the power transmission device is in the state of performing the power transmission at the time of operation of the power supply unit.

The alarm raising means can indicate to a driver that the abnormality of the power transmission device prevents the operation of the power supply unit, thus allowing the driver to take appropriate measures against the failure of the power transmission device.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF PREFERRED EMBODIMENTS

Preferred embodiments of the present invention will be hereinafter described with reference to the accompanying drawings.

A vehicle driven by an internal combustion engine according to the invention may be an ATV (a buggy), a tractor, a recreational vehicle, or the like, that incorporates a power supply unit that uses a generator mounted to an internal combustion engine for driving the vehicle as a power supply to generate AC power at commercial frequencies, and use, a structure, and a type of the vehicle are arbitrary.

Figure 1:
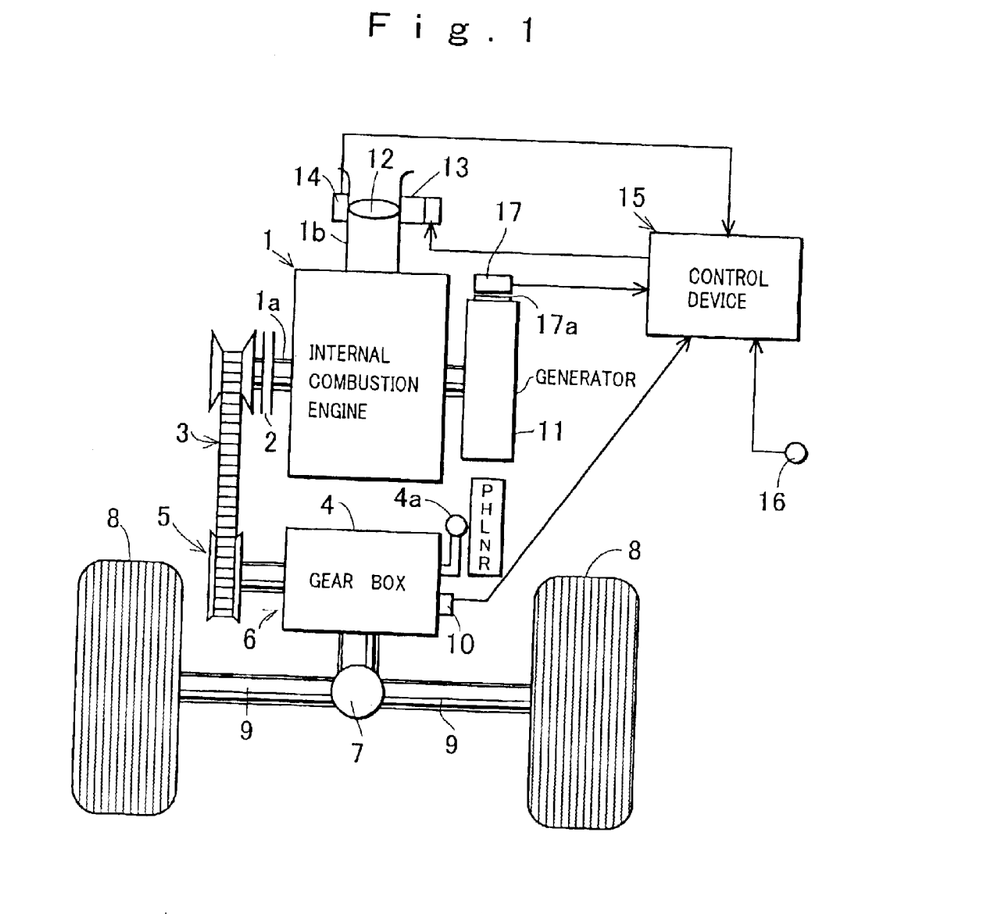
FIG. 1 is a schematic diagram of a construction of a first embodiment of the invention.

FIG. 1 shows an example of a whole construction of the vehicle driven by the internal combustion engine according to the invention. In FIG. 1, a reference numeral 1 denotes an internal combustion engine for driving the vehicle, and an end of a crankshaft 1a of the internal combustion engine 1 is connected to an axle 9 to which drive wheels 8 are mounted, via a power transmission device 6 including an automatic clutch mechanism 2 constituted by a centrifugal clutch or the like, and a CVT (continuously variable transmission) 5 having a belt transmission mechanism 3 and a gear box 4, and a differential gear 7. A gear position selection lever 4a is mounted to the gear box 4, and the lever is operated to switch a gear position to a parking position P, a high position H, a low position L, a neutral position N, or a reverse (backing up) position R. A gear position sensor 10 that detects the gear position is mounted to the gear box 4. Among the gear positions, the neutral position N and the parking position P are positions for cutting power transmission from the internal combustion engine to the drive wheels, and the high position H, the low position L, and the reverse (backing up) position R are positions for transmitting power from the internal combustion engine to the drive wheels.

A rotor of a generator 11 is mounted to the other end of the crankshaft 1a of the internal combustion engine 1. A stator of the generator 11 is secured to a mounting portion provided on a case or a cover of the engine.

The shown generator 11 is a synchronous generator that can perform field control, and a power supply unit is comprised of the generator 11 so as to be operated to supply AC power at commercial frequencies to an external load when the vehicle is stopped.

A throttle valve 12 is mounted to an intake pipe 1b of the internal combustion engine, and an output shaft of an electric actuator 13 is connected to an operation shaft of the throttle valve. An input shaft of a throttle sensor 14 that generates an electric signal proportional to an opening degree of the throttle valve is also connected to the operation shaft of the throttle valve 12.

An unshown injector (an electromagnetic fuel injection valve) is mounted to the intake pipe 1b of the internal combustion engine 1, and an ignition plug is mounted to a cylinder head of the internal combustion engine.

A reference numeral 15 denotes a control device having a microprocessor, and mode selection means 16 constituted by a manually operated switch provides a selection instruction to the control device to select a control mode between a vehicle driving mode and a generating mode.

A signal generator 17 that generates a pulse signal at a particular crank angle position of the engine is mounted to the internal combustion engine 1, and an output of the signal generator is input to the control device 15 together with an output of the gear position sensor 10 and an output of the throttle sensor 14.

The shown signal generator 17 is comprised so as to generate a pulse signal when a leading edge and a trailing edge in a rotational direction of a reluctor (inductor) 17a constituted by a protrusion on an outer periphery of a rotor yoke of the generator 11 are detected.

Various sensors (not shown) that detect control conditions (engine temperature, atmospheric pressure, or the like) used for controlling an ignition timing and a fuel injection amount of the internal combustion engine are provided, and outputs of the sensors are input to the control device 15.

The control device 15 is comprised of an internal combustion engine control unit that performs control required for operating the internal combustion engine; a generation control unit that controls an intake air amount of the internal combustion engine so as to rotate the internal combustion engine at a speed required for supplying predetermined electric power from the power supply unit to the load, and controls a field current of the generator 11; various means required for constituting an on/off determination device that determines on/off of the power transmission device; and safety means for stopping the engine or reducing the rotational speed of the engine less than a power transmission start rotational speed, when it is detected that the power transmission device is in a state of performing power transmission, with the generating mode being selected.

Figure 2:
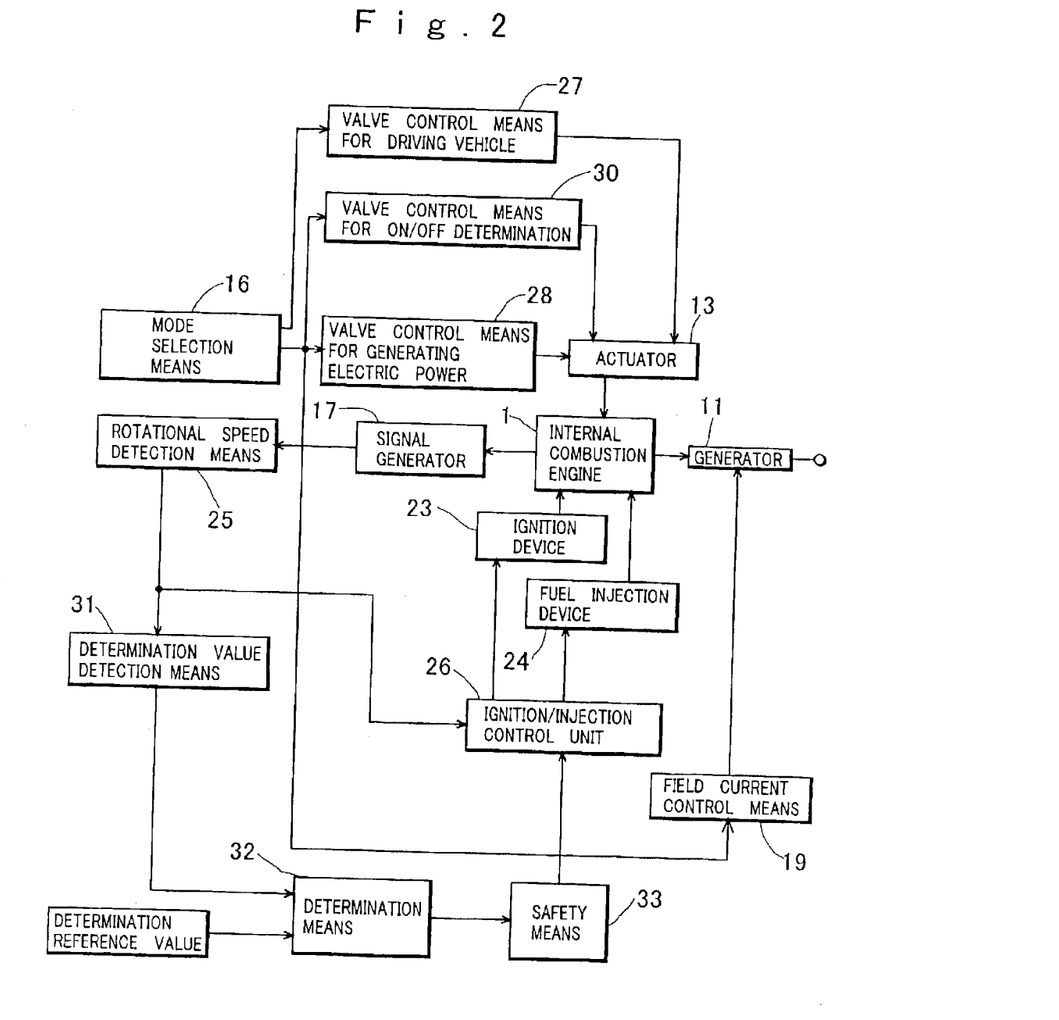
FIG. 2 is a block diagram of a construction example of a control system provided in the embodiment of FIG. 1.

FIG. 2 shows a construction example of a control system constituted by the control device 15 of the vehicle driven by the internal combustion engine in FIG. 1, and electrical components controlled by the control device. In FIG. 2, a reference numeral 23 denotes an ignition device that ignites the internal combustion engine; 24 denotes a fuel injection device that supplies fuel to the engine; 25 denotes rotational speed detection means for detecting the rotational speed of the engine; 26 denotes ignition/injection control unit that controls the ignition device 23 and the fuel injection device 24; and 27 denotes valve control means for driving vehicle, which controls the actuator 13 that operates a valve that adjusts the intake air amount (in this example, the throttle valve 12) when the vehicle is driven. In this example, the internal combustion engine control unit is comprised of the ignition/injection control unit 26 and the valve control means for driving vehicle 27.

The ignition device 23 includes an ignition plug mounted to a cylinder of the engine, and an ignition circuit that generates a high voltage for ignition when the ignition/injection control unit 26 provides an ignition signal and applies the high voltage to the ignition plug. When the ignition/injection control unit 26 provides the ignition signal, a spark is generated in the ignition plug to ignite the engine.

The fuel injection device 24 is comprised of an injector mounted to the intake pipe or the like of the engine; a fuel pump that supplies fuel to the injector; a pressure regulator that keeps pressure of the fuel supplied from the fuel pump to the injector at constant; and an injector drive circuit that passes a drive current through the injector when the ignition/injection control unit 26 provides an injection instruction signal.

The rotational speed detection means 25 arithmetically operates the rotational speed of the internal combustion engine from a generation interval (a time required for the crankshaft to rotate through a certain angle) of pulse signals output by the signal generator 17 to detect the rotational speed of the engine.

The ignition/injection control means 26 is comprised of, for example, ignition timing arithmetic operation means and injection amount arithmetic operation means for arithmetically operating an ignition timing and a fuel injection amount, respectively, of the internal combustion engine in accordance with the various control conditions including the rotational speed detected by the rotational speed detection means 25; ignition signal generation means for generating an ignition signal to be provided to the ignition circuit when the arithmetically operated ignition timing is detected: and injection instruction signal generation means for generating the injection instruction signal to be provided to the injector drive circuit when a predetermined injection start timing is detected.

The injection instruction signal is a rectangular wave signal having a signal width required for injecting the fuel of the arithmetically operated injection amount, and the fuel is injected from the injector while the injection instruction signal is generated.

The valve control means for driving vehicle 27 is means for controlling the actuator 13 that operates the throttle valve 12 so as to adjust the intake air amount of the engine in accordance with a driver's axle operation when the mode selection means 16 selects the vehicle driving mode, and is means for forming what is known as an electronic control throttle.

In the example of FIG. 2, there are provided field current control means 19 for controlling the field current of the generator 11 so as to cause the generator 11 to generate a predetermined output when the mode selection means 16 selects the generating mode; and valve control means for generating electric power 28 for controlling the actuator 13 so as to control the valve (in this example, the throttle valve 12) that adjusts the intake air amount of the engine to keep the rotational speed of the internal combustion engine at a target rotational speed, as the target rotational speed to be a rotational speed required for keeping an output frequency of the generator 11 at a predetermined frequency (50 Hz or 60 Hz) when the mode selection means 16 selects the generating mode, and the generation control unit is comprised of the field current control means 19 and the valve control means for generating electric power 28.

The generation control unit is comprised so that the valve control means for generating electric power performs control only when the mode selection means 16 selects the generating mode in a state where the gear position sensor 10 detects that the gear position is in the neutral position N or the parking position P (both are the gear positions for cutting the power transmission), and a shift to the generating mode is not performed when the mode selection means 16 selects the generating mode in a state where the gear position switch is not in the neutral position or the parking position.

In the example of FIG. 2, there are provided valve control means for on/off determination 30 for controlling the actuator 13 so as to gradually increase the opening degree of the valve that adjusts the intake air amount of the engine (in this example, the throttle valve) when the mode selection means 16 selects the generating mode; determination value detection means 31 for detecting an amount that reflects the load of the internal combustion engine as a determination value; determination means 32 for comparing the determination value detected by the determination value detection means 31 with the determination reference value, and determining whether the power transmission device 6 is in the state of performing the power transmission, or the state of cutting the power transmission; safety means 33 for taking safety measurements required for preventing the vehicle from starting when the determination means 32 determines that the power transmission device 6 is in the state of performing the power transmission. A power transmission on/off determination device is comprised of the valve control means for on/off determination 30, the determination value detection means 31, and the determination means 32.

The valve control means for on/off determination 30 is means for controlling the valve so as to gradually increase the opening degree of the valve that adjusts the intake air amount of the internal combustion engine (an intake air amount adjustment valve) when the generator 11 is started, and the shown valve control means 30 is comprised of means for controlling the actuator 13 so as to gradually increase the opening degree of the throttle valve 12 when the gear position of the transmission of the power transmission device is in the neutral position or the parking position.

The determination value detection means 31 is means for detecting, as a determination value, a value that reflects the magnitude of the load applied on the internal combustion engine when the rotational speed of the internal combustion engine reaches the power transmission start rotational speed in a process where the valve control means for on/off determination 30 gradually increases the opening degree of the intake air amount adjustment valve, and then, when the opening degree of the valve is further increased by a set angle that is preset within a range so as not to start the vehicle. As described later, various values such as the rotational speed of the engine, or the pressure within the intake pipe can be used as the determination value that reflects the magnitude of the load of the internal combustion engine.

The determination means 32 compares the determination value detected by the determination value detection means 31 with the determination reference value, and determines that the power transmission device is in the state of cutting the power transmission when it is determined from the determination value that the magnitude of the load applied on the internal combustion engine is less than a magnitude of a preset determination reference load (the magnitude of the determination reference load is not the determination reference value itself), and determines that the power transmission device is in the state of performing the power transmission when it is determined from the determination value that the magnitude of the load applied on the internal combustion engine is equal to or more than the magnitude of the determination reference load.

The safety means 33 is means for stopping the internal combustion engine, or reducing the rotational speed of the engine less than the power transmission start rotational speed of the power transmission device when the determination means 32 determines that the power transmission device 6 is in the state of performing the power transmission, with the generating mode being selected.

The safety means 33 may be comprised of means for stopping the engine by stopping an ignition operation of the internal combustion engine or by stopping supply of the fuel to the internal combustion engine when the determination means 32 determines that the power transmission device is in the state of performing the power transmission, with the generating mode being selected, or may be comprised of means for returning the rotational speed of the engine less than the power transmission start rotational speed by controlling the actuator 13 so as to return the throttle valve opening degree to an idle opening degree when the determination means 32 determines that the power transmission device is in the state of performing the power transmission, with the generating mode being selected.

The safety means 33 in FIG. 2 is comprised so as to provide an instruction to the ignition/injection control unit 26, and stop the ignition operation and/or the fuel injection operation of the internal combustion engine 1 to stop the engine when the determination means 32 determines that the power transmission device is in the state of performing the power transmission.

Operations of the control device of the vehicle driven by the internal combustion engine according to the embodiment will be described below.

In the vehicle driven by the internal combustion engine in FIG. 1, when the mode selection means 16 selects the vehicle driving mode, the valve control means for driving vehicle 27 controls the actuator 13 so as to adjust the opening degree of the throttle valve 12 in accordance with the driver's axle operation, and controls the rotational speed of the internal combustion engine 1 so that the vehicle is driven at a predetermined rotational speed.

When the vehicle is driven, the valve control means for driving vehicle 27 does not always require to control the actuator so as to adjust the opening degree of the throttle valve, but the valve control means for driving vehicle 27 may be omitted to mechanically operate the throttle valve in accordance with the driver's axle operation.

When the mode selection means 16 selects the generating mode in the state where the gear position sensor 10 detects that the gear position is in the neutral position N or the parking position P, the power transmission on/off determination device in the control device 15 first performs a determination process of determining whether the power transmission device 6 is in the state of cutting the power transmission, or the state of performing the power transmission.

When it is determined that the power transmission device 6 is in the state of cutting the power transmission, the control mode is shifted to the generating mode to cause the valve control means for generating electric power 28 to perform control and keep the rotational speed of the engine at the target rotational speed (the rotational speed required for keeping the output frequency of the generator at the predetermined commercial frequency), and the field current control means 19 controls the field current to keep the output of the generator at a nominal value.

When it is determined in the determination process that the power transmission device 6 is in the state of performing the power transmission, with the generating mode being selected, the safety means 33 controls the engine so as to return the rotational speed of the internal combustion engine less than the power transmission start rotational speed, or stop the internal combustion engine.

In the determination process of determining the on/off state of the power transmission device, the valve control means for on/off determination 30 controls the actuator 13 while monitoring the rotational speed of internal combustion engine 1 to gradually increase the opening degree of the throttle valve 12 of the internal combustion engine, and gradually increase the intake air amount of the engine. When the rotational speed of the internal combustion engine reaches the power transmission start rotational speed (the rotational speed at which the automatic clutch mechanism 2 is connected) in the process where the intake air amount is gradually increased, and then, when the intake air amount is increased by a set amount that is set within a range so as not to start the vehicle, the determination value detection means 31 detects the value that reflects the magnitude of the load applied on the internal combustion engine 1 as the determination value. The determination means 32 compares the determination value with the determination reference value. As a result, when it is determined from the comparison that the magnitude of the load applied on the internal combustion engine is less than the magnitude of the preset determination reference load, the determination means 32 determines that the power transmission device 6 is in the state of cutting the power transmission. When it is determined from the determination value that the magnitude of the load applied on the internal combustion engine is equal to or more than the magnitude of the determination reference load, the determination means 32 determines that the power transmission device 6 is in the state of performing the power transmission.

The above determination value may be any value that indicates a detectable change when the load of the engine such as the rotational speed of the engine or the pressure within the intake pipe changes.

Hereinafter, the process of determining the state of the power transmission device 6 will be described with an example of using the rotational speed of the engine as the determination value. It is assumed that the generation mode is selected at a time t0 in FIG. 5. At this time, the control device 15 supplies a current to the actuator 13, and gradually increases the opening degree of the throttle valve 12 from the idle opening degree θo to increase the intake air amount of the engine. This gradually increases the rotational speed Vn of the engine. When the rotational speed Vn reaches the power transmission start rotational speed Vni at a time t1, the automatic clutch mechanism 2 starts being connected. The throttle valve opening degree is further increased by a set angle Δθ that is preset within a range so as not to start the vehicle from the time t1 at which it is detected that the rotational speed reaches the power transmission start rotational speed, and the rotational speed when it is determined that the throttle valve opening degree is increased by the set angle Δθ at a time t2 is read as a determination value.

Figure 5:
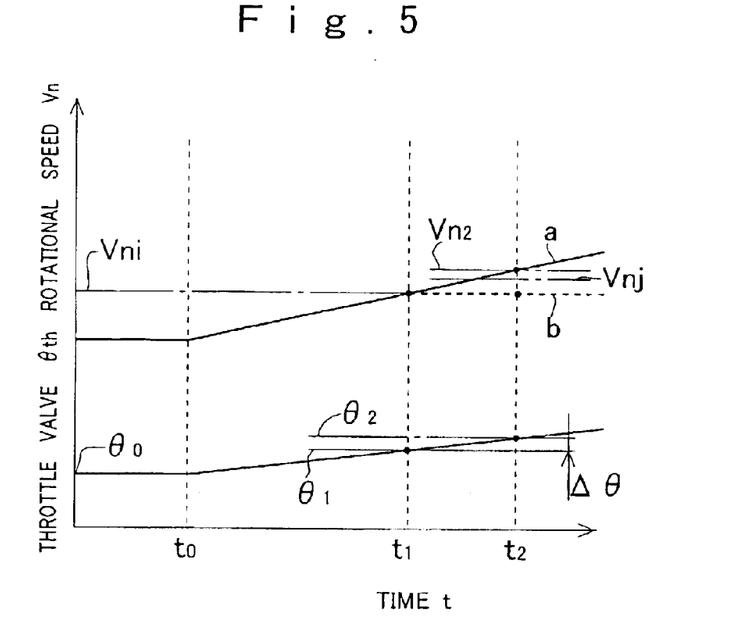
FIG. 5 is a diagram of changes in rotational speed of an internal combustion engine and changes in throttle valve opening degree in a process where the throttle valve opening degree is gradually increased when on/off of a power transmission device is determined in the embodiments of the invention.

When the power transmission device 6 is in the state of cutting the power transmission (for example, the gear position is in the neutral position), no load is applied on the internal combustion engine even if the automatic clutch mechanism 2 is connected, and the rotational speed of the engine continues increasing at the same rate as before as shown by the line a in FIG. 5 even after reaching the power transmission start rotational speed.

On the other hand, when the power transmission device 6 is in the state of performing power transmission (for example, the gear position is in the high position H), connection of the automatic clutch mechanism 2 causes a heavy load to be applied on the internal combustion engine 1, thus the increase in the rotational speed of the engine is restrained as shown by the broken line b in FIG. 5. Thus, when the power transmission device 6 is in the state of cutting the power transmission, the rotational speed when the rotational speed reaches the power transmission start rotational speed, and then the throttle valve is further opened by the set angle Δθ is Vn2, but when the power transmission device is in the state of performing the power transmission, the rotational speed when the rotational speed reaches the power transmission start rotational speed, and then when the throttle valve is further opened by the set angle Δθ is substantially equal to or slightly higher than the power transmission start rotational speed Vni. Thus, if an appropriate determination reference value Vnj is determined, the rotational speed of the engine when the rotational speed reaches the power transmission start rotational speed, and then the throttle valve opening degree is further increased by the set angle Δθ is used as the determination value, and it can be determined that the power transmission device 6 is in the state of cutting the power transmission when the determination value is more than the determination reference value Vnj (Vn>Vnj). It can be also determined that the power transmission device 6 is in the state of performing the power transmission when the determination value is equal to or less than the determination reference value Vnj (Vn≦Vnj).

A ratio ΔVn/Δθ of a difference ΔVn between the rotational speed Vn2 and the power transmission start rotational speed Vni to the set angle Δθ when the rotational speed reaches the power transmission start rotational speed, and then, when the throttle valve opening degree is further increased by the set angle Δθ is calculated as a ratio of increase (a gradient of increase) of the rotational speed to the throttle valve opening degree immediately after the rotational speed reaches the power transmission start rotational speed, and the ratio of increase may be used as the determination value.

When a rate of change with time of the throttle valve opening degree when the throttle valve opening degree is increased by the set angle Δθ is constant, a rate of change ΔVn/(t2−t1) of the rotational speed when the throttle valve opening degree is increased by the set angle may be used as the ratio of increase of the rotational speed to the throttle valve opening degree immediately after the rotational speed reaches the power transmission start rotational speed.

A difference ΔVn between the throttle valve opening degree Vn2 and the power transmission start rotational speed Vni (an amount of increase in the rotational speed) when the rotational speed reaches the power transmission start rotational speed, and then, when the throttle valve opening degree is increased by the set angle Δθ may be used as the determination value.

Here, the determination reference value should be set at a value that is suitable in using the determination value.

The set angle Δθ is set to a value small enough to prevent the vehicle from moving at the time of increase in the throttle valve opening degree by the set angle Δθ (the time t2 in FIG. 5) when the rotational speed reaches the power transmission start rotational speed, and then the power transmission device is in the state of performing the power transmission.

In the example of FIG. 5, in the process where the throttle valve opening degree is gradually increased from the idle opening degree, the rotational speed when the rotational speed of the engine reaches the power transmission start rotational speed, and then, when the throttle valve is further increased by the set angle, the ratio of increase in the rotational speed when the rotational speed of the engine reaches the power transmission start rotational speed, and then, when the throttle valve is further increased by the set angle, or the amount of increase with respect to the power transmission start rotational speed (the value that reflects the rotational speed when the rotational speed of reaches the power transmission start rotational speed, and then, when the throttle valve is further increased by the set angle) is used as the determination value, but a value that reflects an amount of increase in the pressure within the intake pipe when the rotational speed of the engine reaches the power transmission start rotational speed, and then, when the throttle valve opening degree is increased by the set angle may be used as the determination value.

Figure 6:
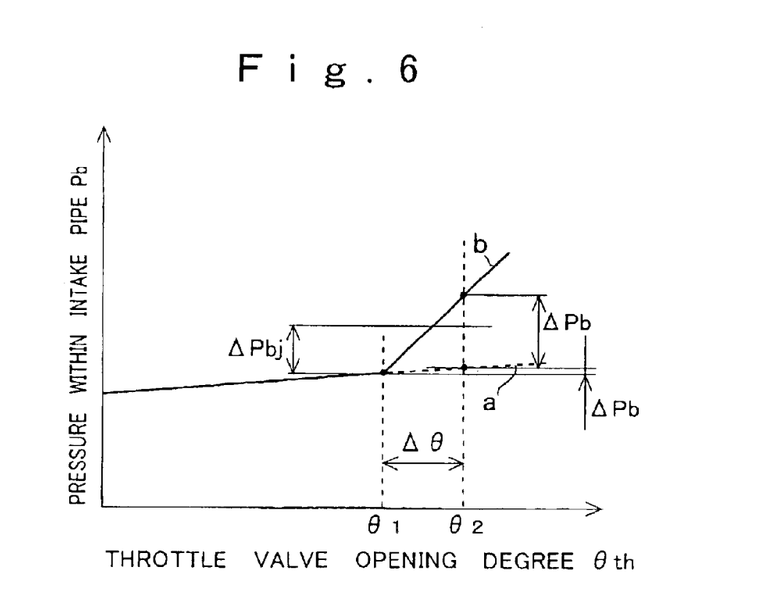
FIG. 6 is a diagram of changes in pressure within an intake pipe of the internal combustion engine in the process where the throttle valve opening degree is gradually increased when the on/off of the power transmission device is determined in the embodiments of the invention.

As shown in FIG. 6, while the throttle valve opening degree θth is gradually increased, an amount of air flowing into the intake pipe is increased to gradually increase the pressure within the intake pipe Pb. It is assumed that when the throttle valve opening degree reaches θ1 in the process where the throttle valve opening degree θth is gradually increased, the rotational speed reaches the power transmission start rotational speed Vni. When the power transmission device is in the state of cutting the power transmission, the rotational speed is increased when the rotational speed reaches the power transmission start rotational speed, and then, when the throttle valve opening degree is further increased by the set angle Δθ (=θ2−θ1). In such a state, air as much as the air flowing into the cylinder from the intake pipe flows into the intake pipe. Thus, the pressure within the intake pipe increases at substantially the same gradient as before as shown by the broken line a in FIG. 6 even after the rotational speed reaches the power transmission start rotational speed. On the other hand, when the power transmission device is in the state of performing the power transmission, the rotational speed changes little when the rotational speed reaches the power transmission start rotational speed, and then, when the throttle valve opening degree is further increased by the set angle Δθ (=θ2−θ1). In such a state, the air flowing into the intake pipe increases with the increase in the throttle valve opening degree while the rotational speed of the engine increases little, thus the pressure within the intake pipe Pb significantly increases as shown by the line b in FIG. 6. Thus, a difference ΔPb (the amount of increase in the pressure within the intake pipe) between the pressure within the intake pipe when the rotational speed reaches the power transmission start rotational speed, and then, when the throttle valve opening degree is further increased by the set angle Δθ in the process where the throttle valve opening degree θth is gradually increased, and the pressure within the intake pipe when the rotational speed reaches the power transmission start rotational speed is used as the determination value. The determination value ΔPb is compared with a determination reference value ΔPbj, and thus it can be determined that the power transmission device is in the state of cutting the power transmission at ΔPb<ΔPbj, and that the power transmission device is in the state of performing the power transmission at ΔPb≧ΔPbj.

A ratio ΔPb/Δθ of a difference ΔPb (the amount of increase in the pressure within the intake pipe) between the pressure within the intake pipe when the rotational speed reaches the power transmission start rotational speed, and then, when the throttle valve opening degree is further increased by the set angle Δθ, and the pressure within the intake pipe when the rotational speed reaches the power transmission start rotational speed to the set angle Δθ is calculated as a ratio of increase of the pressure within the intake pipe to the throttle valve opening degree when the throttle valve opening degree is increased by the set angle Δθ, and the ratio of increase may be used as the determination value.

Also, when a rate of change with time of the throttle valve when the throttle valve opening degree is changed by the set angle Δθ is constant, a rate of change with time of the pressure within the intake pipe when the throttle valve opening degree is increased by the set angle Δθ may be used as the determination value.

Further, as shown below, it may be used, as the determination value, a load value of the internal combustion engine arithmetically operated in an ECU based on various parameters, when the rotational speed of the engine reaches the power transmission start rotational speed in the process where the throttle opening degree is gradually increased, and then, when the throttle opening degree is further increased by the set angle.

In the internal combustion engine, since there are certain relationships among the throttle opening degree, the rotational speed and the load value of the engine and among the pressure within the intake pipe, the rotational speed and the load value of the engine, the load value of the internal combustion engine can be arithmetically operated by the throttle opening degree and the rotational speed if those are operated, and also, the load value of the engine can be arithmetically operated by the pressure within the intake pipe and the rotational speed if those are operated. In addition, in the internal combustion engine, the load value of the engine can be arithmetically operated based on a measurement value of the intake air amount into the cylinder, since there are certain relationships between the intake air amount into the cylinder and the load value.

Therefore, the load value of the internal combustion engine may be arithmetically operated by following methods, for example.

(A) Preparing a map providing a relationship among the throttle opening degree, the rotational speed and the load value of the engine, and searching the map against the detected throttle opening degree and the detected rotational speed to arithmetically operate the load value.

(B) Preparing a map providing a relationship among the pressure within the intake pipe, the rotational speed and the load value of the engine, and detecting the map against the detected pressure within the intake pipe and the detected rotational speed to arithmetically operate the load value.

(C) Preparing a map providing a relationship the intake air amount into the cylinder and the load value of the engine, and detecting the map against the detected intake air amount to arithmetically operate the load value.

When the rotational speed reaches the power transmission start rotational speed in the process where the throttle valve opening degree is gradually increased, and then, when the throttle valve opening degree is further increased by the set value, the load value of the engine is arithmetically operated by any one of the above methods. In the case where the operated load value is used as the determination value, the determination means is comprised so as to determine that the power transmission device is in a state of cutting the power transmission when it is determined that the determination value is less than the preset determination reference value, and so as to determine that the power transmission device is in a state of performing the power transmission when it is determined that the determination value is equal to or more than the preset determination reference value.

Examples of the values that can be used as the determination values that reflect the magnitude of the load in the invention will be as follows:

(a) the rotational speed of the engine when the rotational speed of the engine reaches the power transmission start rotational speed in the process where the opening degree of the valve that adjusts the intake air amount is gradually increased from the opening degree at the idle rotation, and then, when the opening degree of the valve that adjusts the intake air amount is further increased by the set value;

(b) the amount of increase in the rotational speed with respect to the power transmission start rotational speed when the rotational speed of the engine reaches the power transmission start rotational speed in the process where the opening degree of the valve that adjusts the intake air amount is gradually increased from the opening degree at the idle rotation, and then, when the opening degree of the valve that adjusts the intake air amount is increased by the set value;

(c) the ratio of increase in the rotational speed while the rotational speed of the engine reaches the power transmission start rotational speed in the process where the opening degree of the valve that adjusts the intake air amount is gradually increased from the opening degree at the idle rotation, and then, when the opening degree of the valve that adjusts the intake air amount is increased by the set value;

(d) the amount of increase in the pressure within the intake pipe (an absolute pressure) when the rotational speed of the engine reaches the power transmission start rotational speed in the process where the opening degree of the valve that adjusts the intake air amount is gradually increased from the opening degree at the idle rotation, and then, when the opening degree of the valve that adjusts the intake air amount is increased by the set value; and (e) the value of the load of the internal combustion engine, which is arithmetically operated by using at least one of the rotational speed, the pressure within the intake pipe, the opening degree of the throttle valve and the intake air amount flowing into the cylinder, when the rotational speed of the engine reaches the power transmission start rotational speed in the process where the opening degree of the valve that adjusts the intake air amount is gradually increased from the opening degree at the idle rotation, and then, when the opening degree of the valve that adjusts the intake air amount is increased by the set value.

When the amount of increase in the pressure within the intake pipe is used as the determination value, a pressure sensor that detects pressure within the intake pipe 1b downstream from the throttle valve 12 is mounted to the intake pipe 1b, and an output of the pressure sensor is input to the control device 15.

The valve that adjusts the intake air amount is a throttle valve, or an ISC valve (Idle Speed Control Valve) or an IAC valve (Idle Air Control Valve) that adjusts the amount of air passing through a bypass passage provided so as to bypass the throttle valve, or the like.

In the embodiment of FIG. 1, the synchronous generator that can perform the field control is used as the generator 11, and thus the generator 11 only can constitute the power supply unit, but an AC generator that cannot perform the field control is used as the generator 11, the power supply unit requires to be comprised so that the output of the generator 11 is first converted into a DC voltage, and then converted into an AC voltage at commercial frequencies.

Figure 3:
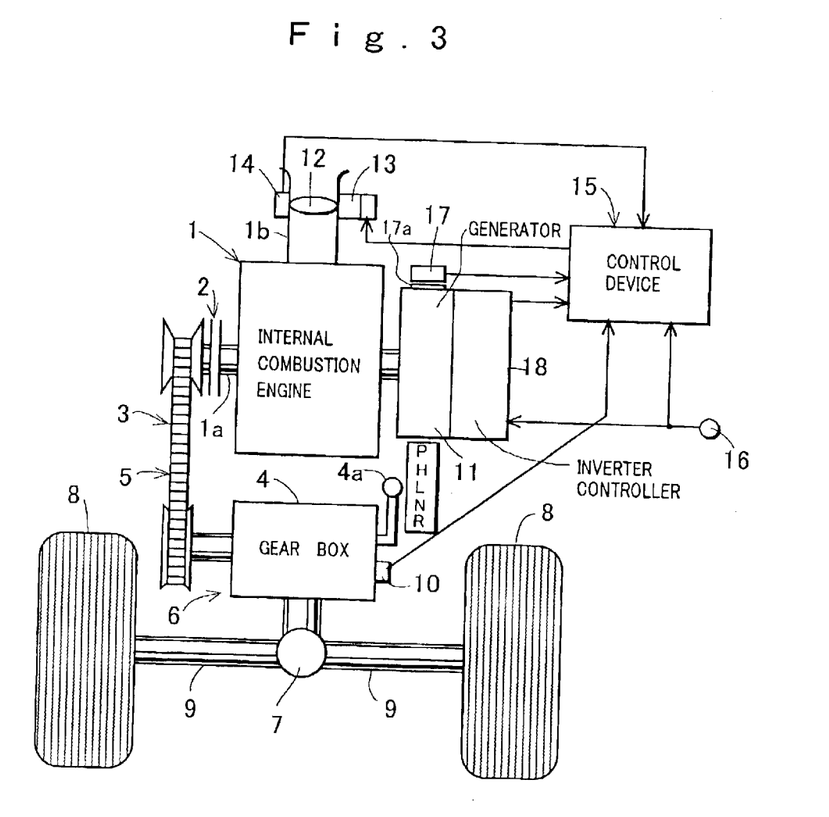
FIG. 3 is a schematic diagram of a construction of a second embodiment of the invention.
Figure 4:
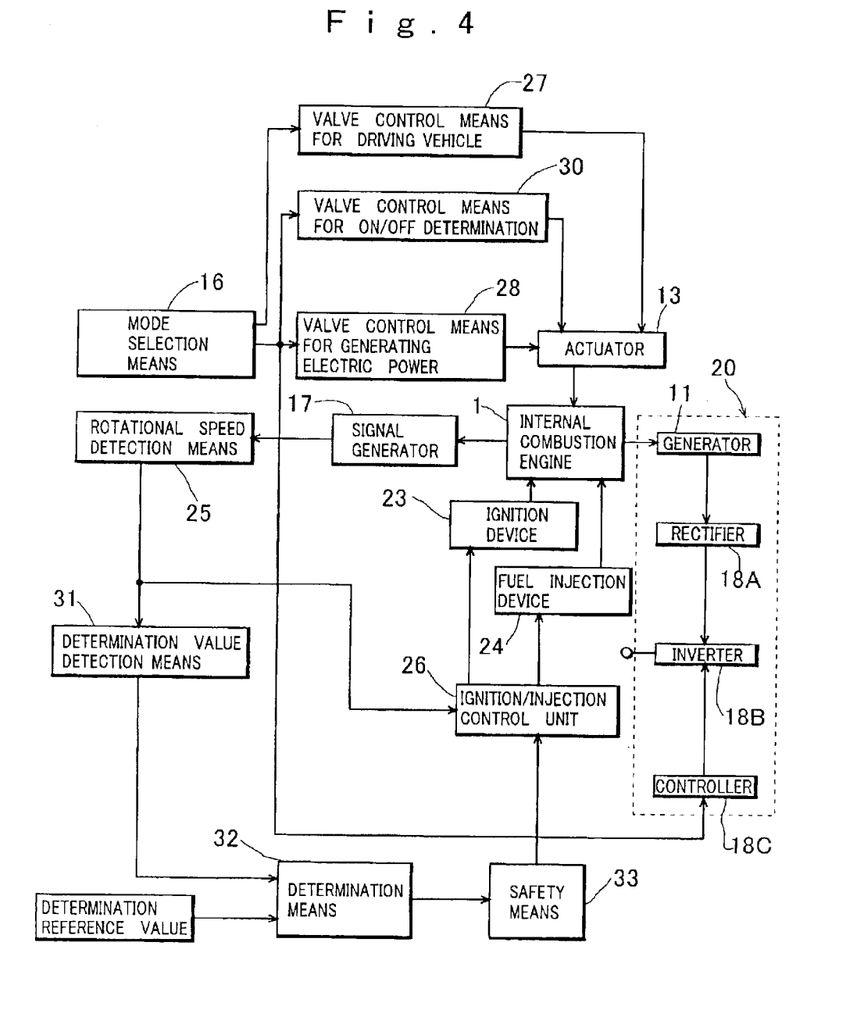
FIG. 4 is a block diagram of a construction example of a control system provided in the embodiment of FIG. 3.

FIG. 3 schematically shows an example of a construction of a vehicle driven by an internal combustion engine incorporating a power supply unit when a magneto that cannot perform the field control is used as a generator 11, and FIG. 4 shows a construction example of a system comprised of a control device 15 and electrical components controlled by the control device in the case of FIG. 3.

In this embodiment, an inverter controller unit 18 is provided in addition to the magneto 11. As shown in FIG. 4, the inverter controller unit 18 includes a rectifier 18A that rectifies an output of the generator 11, an inverter 18B that converts an output of the rectifier 18A into an AC output, and a controller 18C. The controller 18C includes inverter control means for controlling the inverter so as to output an AC voltage at commercial frequencies, and target rotational speed arithmetic operation means for arithmetically operating a rotational speed of an engine required for matching the output voltage of the inverter with a target value as a target rotational speed, based on a deviation between the target value of the AC voltage (an effective value) output from the inverter and a DC voltage output from the rectifier.

The inverter control means provided in the controller unit 18 controls on/off of a switch element that constitutes the inverter at a predetermined timing so as to output the AC voltage at predetermined frequencies from the inverter.

The target rotational speed arithmetic operation means of the inverter controller unit 18 arithmetically operates the rotational speed of the engine required for matching the output voltage of the inverter with the target value as the target rotational speed, based on the deviation between the target value of the AC voltage output from the inverter and the DC voltage output from the rectifier, and provides a signal that indicates the target rotational speed to the control device 15.

Valve control means for generating electric power 28 provided in the control device 15 controls an actuator 13 to adjust an opening degree of a throttle valve 12 so as to match the rotational speed of the internal combustion engine 1 with the target rotational speed, when mode selection means 16 selects a generating mode, and when a gear position sensor 10 detects that a gear position of a transmission 5 is in a neutral position or a parking position. Other constructions are similar to those in the embodiment of FIGS. 1 and 2.

In this embodiment, a power supply unit 20 that uses the generator driven by the internal combustion engine when the vehicle is stopped as a power supply, and supplies power to an external load is comprised of the generator 11, the rectifier 18A, and the inverter 18B.

Figure 7:
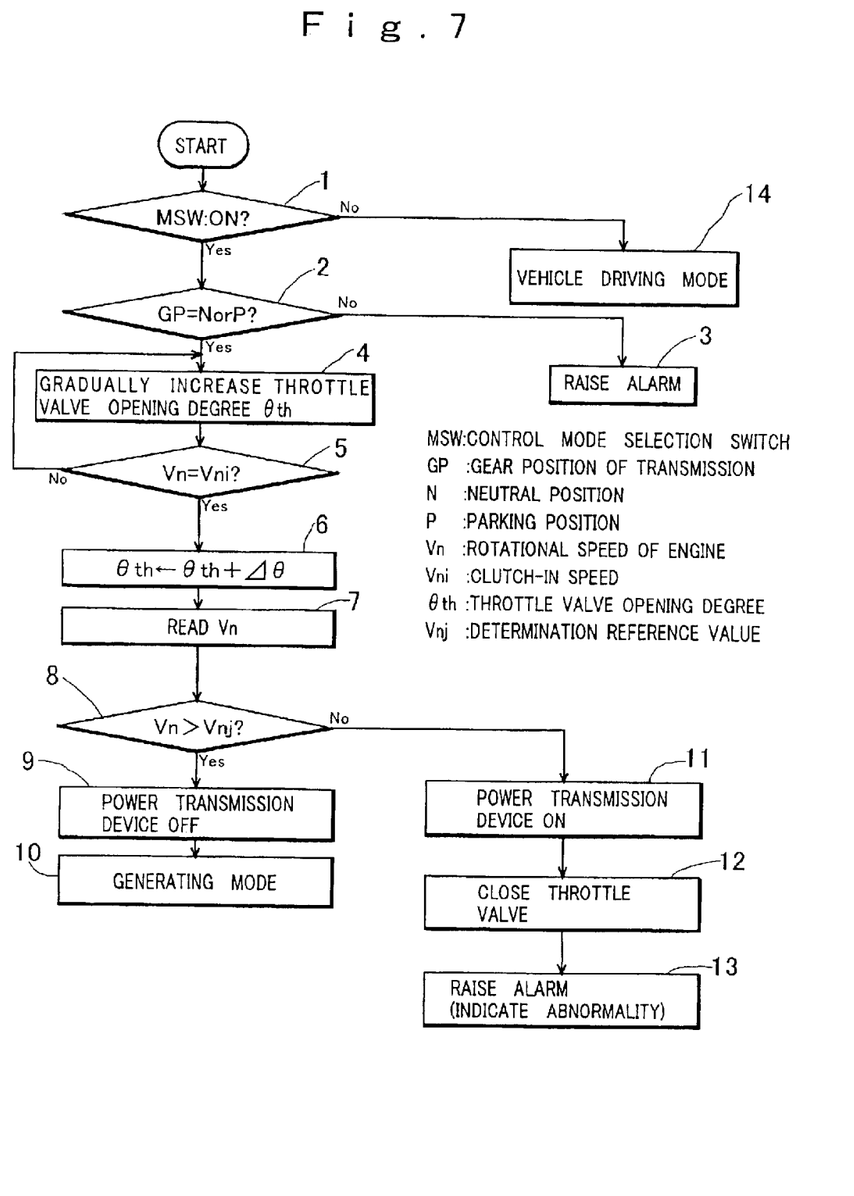
FIG. 7 is a flowchart of an example of an algorithm of essential portions of a program executed by a microprocessor in order to configure a control device used in a vehicle driven by an internal combustion engine according to the invention.

The control device 15 in the embodiments of FIGS. 1 and 3 includes the microprocessor, and a predetermined program is executed by the microprocessor to provide means for achieving various functions required for constituting the internal combustion engine control unit and the generation control unit. FIG. 7 shows an example of an algorithm of essential portions of the program executed by the microprocessor in order to form the on/off determination device according to the invention.

According to the algorithm, first in Step 1, it is determined whether or not a mode selection switch MSW that constitutes the mode selection means 16 is in an on state (whether or not the generating mode is selected). When it is determined that the mode selection switch is in the on state and the generating mode is selected, the process goes to Step 2, and it is determined whether the gear position of the transmission is in the neutral position N or the parking position P. As the result, when the gear position of the transmission is not in the neutral position N or the parking position P (a position for cutting the power transmission), the process goes to Step 3, and an alarm is raised to prohibit a shift to the generating mode.

In Step 2, when it is determined that the gear position of the transmission is in the neutral position N or the parking position P, the process goes to Step 4, and the actuator 13 is controlled so as to gradually increase the throttle valve opening degree θth from the idle opening degree, and as shown in FIG. 5, the rotational speed Vn of the internal combustion engine is gradually increased. In the meantime, the rotational speed Vn of the engine is monitored, and when it is detected in Step 5 that the rotational speed Vn of the engine reaches the power transmission start rotational speed Vni, the process goes to Step 6, and the actuator 13 is controlled so as to further increase the throttle valve opening degree θth by the set angle Δθ. Next, when it is confirmed that the throttle valve opening degree is increased by the set angle Δθ, the rotational speed Vn of the engine is read in Step 7, and the read rotational speed Vn is compared with the determination reference value Vnj in Step 8. Then, it is determined that the power transmission device is in the state of cutting the power transmission (an off state) at the time of Vn>Vnj (Step 9), and the process goes to Step 10 to shift to the generating mode.

In the generating mode, the internal combustion engine and the power supply unit 20 are controlled so as to generate a predetermined AC output from the power supply unit. As shown in FIG. 1, when the synchronous generator that can perform the field control is used as the generator 11, the actuator 13 is controlled by the valve control means for generating electric power 28 so as to rotate the internal combustion engine at a speed required for causing the generator (the power supply unit) to output an AC voltage at commercial frequencies, and the field current of the generator is controlled so that the output of the generator becomes a nominal output.

As shown in FIGS. 3 and 4, when the magneto that does not perform the field control is used as the generator 11, and the generator 11, the rectifier 18A, and the inverter 18B constitute the power supply unit, the actuator 13 is controlled (the throttle valve opening degree is controlled) so as to match the rotational speed of the internal combustion engine with the target rotational speed calculated based on the deviation between the target value of the output voltage of the inverter 18B and the output voltage of the rectifier, and the switch element that constitutes the inverter is controlled on/off so as to cause the inverter 18B to generate the AC voltage at commercial frequencies.

In Step 8 in FIG. 7, when it is determined to be Vn≦Vnj [Vn: the rotational speed of the engine (the determination value), Vnj: the determination reference value], it is determined that the power transmission device is in the state of performing the power transmission (the on state) (Step 11), and the actuator 13 is controlled so as to immediately displace the throttle valve to an idle position in Step 12. Then, in Step 13, a lamp is illuminated, or an alarm (abnormality) is raised by a beeper or the like to prohibit a shift to the generating mode.

When it is determined in Step 1 that the mode selection switch is in the off state (when the vehicle driving mode is selected), the process goes to Step 14 to shift to the vehicle driving mode. In the vehicle driving mode, the actuator 13 is controlled so as to change the throttle valve opening degree in accordance with the driver's axle operation.

According to the algorithm in FIG. 7, in Steps 1 to 4, the valve control means for on/off determination which controls the actuator so as to gradually increase the throttle valve opening degree (the opening degree of the intake air amount adjustment valve) of the internal combustion engine when the mode selection means selects the generating mode is comprised.

In Steps 5 to 7, it is comprised the determination detection means for detecting, as the determination value, the value that reflects the magnitude of the load applied on the internal combustion engine when the rotational speed of the internal combustion engine reaches the power transmission start rotational speed in the process where the valve control means for on/off determination gradually increases the opening degree of the intake air amount adjustment valve, and then, when the throttle valve opening degree is increased by the set angle that is preset within the range so as not to start the vehicle.

Further, in Steps 8 to 10, it is comprised the determination means for determining that the power transmission device is in the state of cutting the power transmission when it is determined from the determination value that the load applied on the internal combustion engine is less than the preset determination reference load, and determining that the power transmission device is in the state of performing the power transmission when it is determined from the determination value that the load applied on the internal combustion engine is more than the determination reference load.

In Step 12, it is comprised the safety means 33 for controlling the actuator so as to reduce the rotational speed of the internal combustion engine less than the power transmission start rotational speed when the determination means determines that the power transmission device is in the state of performing the power transmission, and in Steps 3 and 13, it is comprised the alarm raising means for raising the alarm of abnormality in the power transmission device 6 when the determination means 32 determines that the power transmission device is in the state of performing the power transmission with the mode selection means 16 selecting the generating mode.

As described above, according to the invention, the opening degree of the valve that adjusts the intake air amount of the internal combustion engine is gradually increased while the rotational speed of the internal combustion engine is monitored when the generating mode is selected. In this process, the value that reflects the magnitude of the load applied on the internal combustion engine, when the rotational speed of the internal combustion engine reaches the power transmission start rotational speed, and then, when the valve opening degree is further increased by the set angle that is preset within the range so as not to start the vehicle, is detected as the determination value. Then, when it is determined from the determination value that the load applied on the internal combustion engine is less than the preset determination reference load, it is determined that the power transmission device is in the state of cutting the power transmission, and when it is determined that the load applied on the internal combustion engine is more than the determination reference load, it is determined that the power transmission device is in the state of performing the power transmission. This allows the on/off state of the power transmission device to be accurately detected even if a failure of the gear position sensor, or a failure of the transmission of the power transmission device prevents the gear position sensor from accurately detecting the on/off state of the power transmission device.

In the invention, the safety means for stopping the internal combustion engine or reducing the rotational speed of the internal combustion engine less than the power transmission start rotational speed, when it is determined by the above described on/off determination method that the power transmission device is in the state of performing the power transmission at the time of generation, is provided; thus preventing the vehicle from being started at the time of generation, and increasing safety.

According to the invention, it can be determined whether the power transmission device is in the state of cutting the power transmission, or the state of performing the power transmission independently of the gear position sensor. Thus, there is no need for the gear position sensor 10, but for higher reliability, the gear position sensor 10 may be provided.

When the gear position sensor 10 that detects the gear position of the power transmission device 6 is provided, and the valve control means for generating electric power 30 is comprised so as to control to rotate the internal combustion engine at a rotational speed required for supplying predetermined electric power from the power supply unit 20 to the load only when the gear position sensor 10 detects that the power transmission device 6 is in the state of cutting the power transmission, the alarm raising means may be comprised so as to raise an alarm of abnormality in the power transmission device 6 when the determination means 32 determines that the power transmission device is in the state of performing the power transmission, with the gear position sensor 10 detecting that the power transmission device 6 is in the state of cutting the power transmission.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. A vehicle driven by an internal combustion engine comprising:
   a power transmission device that is provided between a crankshaft of said internal combustion engine and drive wheels of said vehicle, and enters a state of transmitting power from said internal combustion engine to said drive wheels when a rotational speed of said internal combustion engine reaches a predetermined power transmission start rotational speed or higher; and
   a power supply unit that uses a generator driven by said internal combustion engine as a power source to supply electric power to a load when said vehicle is stopped,
   wherein said vehicle driven by said internal combustion engine further comprises:
   rotational speed detection means for detecting the rotational speed of said internal combustion engine;
   valve control means for on/off determination which controls means for operating a valve that adjusts an intake air amount of said internal combustion engine so as to gradually increase an opening degree of said valve when an instruction to start said generator is provided;
   determination value detection means for detecting, as a determination value, a value that reflects a magnitude of a load applied on said internal combustion engine when the rotational speed of the internal combustion engine reaches said power transmission start rotational speed in a process where said valve control means for on/off determination gradually increases said valve opening degree, and then, when said valve opening degree is further increased by a set angle that is preset within a range so as not to start said vehicle; and
   determination means for determining that said power transmission device is in a state of cutting power transmission when it is determined from said determination value that the load applied on the internal combustion engine is less than a preset determination reference load, and determining that said power transmission device is in a state of performing the power transmission when it is determined from the determination value that the load applied on said internal combustion engine is equal to or more than said determination reference load.

2. The vehicle driven by the internal combustion engine according to claim 1, wherein said determination value is a rotational speed of the internal combustion engine when the rotational speed of the internal combustion engine reaches the power transmission start rotational speed in the process where said valve opening degree is gradually increased, and then, when said valve opening degree is further increased by said set angle, and
   said determination means determines that said power transmission device is in the state of cutting the power transmission when said determination value is more than a determination reference value, and determines that said power transmission device is in the state of performing the power transmission when said determination value is equal to or less than the determination reference value.

3. The vehicle driven by the internal combustion engine according to claim 1, wherein said determination value is a ratio of increase of the rotational speed to said valve opening degree when the rotational speed of the internal combustion engine reaches the power transmission start rotational speed in the process where said valve opening degree is gradually increased, and then, when said valve opening degree is further increased by said set angle, and
   said determination means determines that said power transmission device is in the state of cutting the power transmission when said determination value is more than the determination reference value, and determines that said power transmission device is in the state of performing the power transmission when said determination value is equal to or less than the determination reference value.

4. The vehicle driven by the internal combustion engine according to claim 1, wherein said determination value is a ratio of increase of a pressure within an intake pipe of said internal combustion engine to said valve opening degree when the rotational speed of the internal combustion engine reaches the power transmission start rotational speed in the process where said valve opening degree is gradually increased, and then, when said valve opening degree is further increased by said set angle, and
   said determination means determines that said power transmission device is in the state of cutting the power transmission when said determination value is less than the preset determination reference value, and determines that said power transmission device is in the state of performing the power transmission when said determination value is equal to or more than said determination reference value.

5. The vehicle driven by the internal combustion engine according to claim 1, wherein said determination value is an amount of increase in the pressure within the intake pipe of said internal combustion engine when the rotational speed of the internal combustion engine reaches the power transmission start rotational speed in the process where said valve opening degree is gradually increased, and then, when said valve opening degree is further increased by said set angle, and
   said determination means determines that said power transmission device is in the state of cutting the power transmission when said determination value is less than the preset determination reference value, and determines that said power transmission device is in the state of performing the power transmission when said determination value is equal to or more than said determination reference value.

6. The vehicle driven by the internal combustion engine according to claim 1, wherein said determination value is a load value of the internal combustion engine arithmetically operated based on at least one of the rotational speed of said internal combustion engine, the pressure within the intake pipe, an opening degree of a throttle valve and an intake air amount flowing into a cylinder, when the rotational speed of the internal combustion engine reaches said power transmission start rotational speed in the process where said valve opening degree is gradually increased, and then, when said valve opening degree is further increased by said set angle, and said determination means determines that said power transmission device is in the state of cutting the power transmission when said determination value is less than the preset determination reference value, and determines that said power transmission device is in the state of performing the power transmission when said determination value is equal to or more than said determination reference value.

7. The vehicle driven by the internal combustion engine according to claim 1, further comprising safety means for returning the rotational speed of said internal combustion engine less than said power transmission start rotational speed, when said determination means determines that said power transmission device is in the state of performing the power transmission.

8. The vehicle driven by the internal combustion engine according to claim 1, further comprising safety means for stopping said internal combustion engine when said determination means determines that said power transmission device is in the state of performing the power transmission.

9. A vehicle driven by an internal combustion engine comprising:
a power transmission device that includes a transmission having a gear position for cutting power transmission and an automatic clutch mechanism connected at a speed equal to or higher than a predetermined power transmission start rotational speed, and is provided between a crankshaft of said internal combustion engine and drive wheels of said vehicle;
a power supply unit that uses a generator driven by said internal combustion engine as a power source to supply electric power to a load;
an actuator that operates a valve that adjusts an intake air amount of said internal combustion engine;
mode selection means for selecting a control mode of said internal combustion engine between a vehicle driving mode and a generating mode; and
a generation control unit having speed control means which controls the intake air amount of said internal combustion engine so as to rotate said internal combustion engine at a rotational speed required for supplying predetermined electric power from said power supply unit to the load when said mode selection means selects the generating mode,
wherein said vehicle driven by said internal combustion engine further comprises:
rotational speed detection means for detecting the rotational speed of said internal combustion engine;
valve control means for on/off determination which controls said actuator so as to gradually increase an opening degree of said valve when said mode selection means selects the generating mode;

determination value detection means for detecting, as a determination value, a value that reflects a magnitude of a load applied on said internal combustion engine when the rotational speed of the internal combustion engine reaches said power transmission start rotational speed in a process where said valve control means for on/off determination gradually increases said valve opening degree, and then, when said valve opening degree is further increased by a set angle that is preset within a range so as not to start said vehicle; and determination means for determining that said power transmission device is in a state of cutting power transmission when it is determined from said determination value that the load applied on the internal combustion engine is less than a preset determination reference load, and determining that said power transmission device is in a state of performing the power transmission when it is determined from the determination value that the load applied on said internal combustion engine is equal to or more than said determination reference load.

10. The vehicle driven by the internal combustion engine according to claim 9, wherein said determination value is a rotational speed of the internal combustion engine when the rotational speed of the internal combustion engine reaches the power transmission start rotational speed in the process where said valve opening degree is gradually increased, and then, when said valve opening degree is further increased by said set angle, and said determination means determines that said power transmission device is in the state of cutting the power transmission when said determination value is more than a determination reference value, and determines that said power transmission device is in the state of performing the power transmission when said determination value is equal to or less than the determination reference value.

11. The vehicle driven by the internal combustion engine according to claim 9, wherein said determination value is a ratio of increase of the rotational speed to said valve opening degree when the rotational speed of the internal combustion engine reaches the power transmission start rotational speed in the process where said valve opening degree is gradually increased, and then, when said valve opening degree is further increased by said set angle, and said determination means determines that said power transmission device is in the state of cutting the power transmission when said determination value is more than the determination reference value, and determines that said power transmission device is in the state of performing the power transmission when said determination value is equal to or less than the determination reference value.

12. The vehicle driven by the internal combustion engine according to claim 9, wherein said determination value is a ratio of increase of a pressure within an intake pipe of said internal combustion engine to said valve opening degree when the rotational speed of the internal combustion engine reaches the power transmission start rotational speed in the process where said valve opening degree is gradually increased, and then, when said valve opening degree is further increased by said set angle, and said determination means determines that said power transmission device is in the state of cutting the power transmission when said determination value is less than the preset determination reference value, and determines that said power transmission device is in the state of performing the power transmission when said determination value is equal to or more than said determination reference value.

13. The vehicle driven by the internal combustion engine according to claim 9, wherein said determination value is an amount of increase in the pressure within the intake pipe of said internal combustion engine when the rotational speed of the internal combustion engine reaches the power transmission start rotational speed in the process where said valve opening degree is gradually increased, and then, when said valve opening degree is further increased by said set angle, and said determination means determines that said power transmission device is in the state of cutting the power transmission when said determination value is less than the preset determination reference value, and determines that said power transmission device is in the state of performing the power transmission when said determination value is equal to or more than said determination reference value.

14. The vehicle driven by the internal combustion engine according to claim 9, wherein said determination value is a load value of the internal combustion engine arithmetically operated based on at least one of the rotational speed of said internal combustion engine, the pressure within the intake pipe, an opening degree of a throttle valve and an intake air amount flowing into a cylinder, when the rotational speed of the internal combustion engine reaches said power transmission start rotational speed in the process where said valve opening degree is gradually increased, and then, when said valve opening degree is further increased by said set angle, and said determination means determines that said power transmission device is in the state of cutting the power transmission when said determination value is less than the preset determination reference value, and determines that said power transmission device is in the state of performing the power transmission when said determination value is equal to or more than said determination reference value.

15. The vehicle driven by the internal combustion engine according to claim 9, further comprising safety means for returning the rotational speed of said internal combustion engine less than said power transmission start rotational speed, when said determination means determines that said power transmission device is in the state of performing the power transmission.

16. The vehicle driven by the internal combustion engine according to claim 9, further comprising safety means for stopping said internal combustion engine when said determination means determines that said power transmission device is in the state of performing the power transmission.

17. The vehicle driven by the internal combustion engine according to claim 9, further comprising alarm raising means for raising an alarm of abnormality in said power transmission device when said determination means determines that said power transmission device is in the state of performing the power transmission, with said mode selection means selecting the generating mode.

18. The vehicle driven by the internal combustion engine according to claim 9, further comprising:

a gear position sensor that detects a gear position of said power transmission device, wherein said speed control means is comprised so as to control to rotate said internal combustion engine at the rotational speed required for supplying the predetermined electric power from said power supply unit to the load only when said gear position sensor detects that said power transmission device is in the state of cutting the power transmission; and alarm raising means for raising an alarm of abnormality in said power transmission device when said determination means determines that said power transmission device is in the state of performing the power transmission, with said gear position sensor detecting that said power transmission device is in the state of cutting the power transmission.

19. An on/off determination device of a power transmission device for a vehicle driven by an internal combustion engine, which determines whether said power transmission device of said vehicle is in a state of performing power transmission, or a state of cutting the power transmission, said power transmission device being provided between a crankshaft of said internal combustion engine and drive wheels of said vehicle, and enters a state of transmitting power from said internal combustion engine to said drive wheels when a rotational speed of said internal combustion engine reaches a predetermined power transmission start rotational speed or higher, said vehicle driven by said internal combustion engine comprising:

a power supply unit that uses a generator driven by said internal combustion engine as a power source to supply electric power to a load when said vehicle is stopped, wherein said vehicle driven by said internal combustion engine further comprises:

rotational speed detection means for detecting the rotational speed of said internal combustion engine;

valve control means for on/off determination which controls means for operating a valve that adjusts an intake air amount of said internal combustion engine so as to gradually increase an opening degree of said valve when an instruction to start said generator is provided;

determination value detection means for detecting, as a determination value, a value that reflects a magnitude of a load applied on said internal combustion engine when the rotational speed of the internal combustion engine reaches said power transmission start rotational speed in a process where said valve control means for on/off determination gradually increases said valve opening degree, and then, when said valve opening degree is further increased by a set angle that is preset within a range so as not to start said vehicle; and determination means for determining that said power transmission device is in a state of cutting power transmission when it is determined from said determination value that the load applied on the internal combustion engine is less than a preset determination reference load, and determining that said power transmission device is in a state of performing the power transmission when it is determined from the determination value that the load applied on said internal combustion engine is equal to or more than said determination reference load.

20. The on/off determination device of the power transmission device for the vehicle driven by the internal combustion engine according to claim 19, wherein said determination value is a rotational speed of the internal combustion engine when the rotational speed of the internal combustion engine reaches the power transmission start rotational speed in the process where said valve opening degree is gradually increased, and then, when said valve opening degree is further increased by said set angle, and said determination means determines that said power transmission device is in the state of cutting the power transmission when said determination value is more than a determination reference value, and determines that said power transmission device is in the state of performing the power transmission when said determination value is equal to or less than the determination reference value.

21. The on/off determination device of the power transmission device for the vehicle driven by the internal combustion engine according to claim 19, wherein said determination value is a ratio of increase of the rotational speed to said valve opening degree when the rotational speed of the internal combustion engine reaches the power transmission start rotational speed in the process where said valve opening degree is gradually increased, and then, when said valve opening degree is further increased by said set angle, and said determination means determines that said power transmission device is in the state of cutting the power transmission when said determination value is more than the determination reference value, and determines that said power transmission device is in the state of performing the power transmission when said determination value is equal to or less than the determination reference value.

22. The on/off determination device of the power transmission device for the vehicle driven by the internal combustion engine according to claim 19, wherein said determination value is a ratio of increase of a pressure within an intake pipe of said internal combustion engine to said valve opening degree when the rotational speed of the internal combustion engine reaches the power transmission start rotational speed in the process where said valve opening degree is gradually increased, and then, when said valve opening degree is further increased by said set angle, and said determination means determines that said power transmission device is in the state of cutting the power transmission when said determination value is less than the preset determination reference value, and determines that said power transmission device is in the state of performing the power transmission when said determination value is equal to or more than said determination reference value.

23. The on/off determination device of the power transmission device for the vehicle driven by the internal combustion engine according to claim 19, wherein said determination value is an amount of increase in the pressure within the intake pipe of said internal combustion engine when the rotational speed of the internal combustion engine reaches the power transmission start rotational speed in the process where said valve opening degree is gradually increased, and then, when said valve opening degree is further increased by said set angle, and said determination means determines that said power transmission device is in the state of cutting the power transmission when said determination value is less than the preset determination reference value, and determines that said power transmission device is in the state of performing the power transmission when said determination value is equal to or more than said determination reference value.

24. The on/off determination device of the power transmission device for the vehicle driven by the internal combustion engine according to claim 19, wherein said determination value is a load value of the internal combustion engine arithmetically operated based on at least one of the rotational speed of said internal combustion engine, the pressure within the intake pipe, an opening degree of a throttle valve and an intake air amount flowing into a cylinder, when the rotational speed of the internal combustion engine reaches said power transmission start rotational speed in the process where said valve opening degree is gradually increased, and then, when said valve opening degree is further increased by said set angle, and said determination means determines that said power transmission device is in the state of cutting the power transmission when said determination value is less than the preset determination reference value, and determines that said power transmission device is in the state of performing the power transmission when said determination value is equal to or more than said determination reference value.

25. An on/off determination device of a power transmission device for a vehicle driven by an internal combustion engine, which determines whether said power transmission device of said vehicle driven by said internal combustion engine is in a state of performing power transmission, or a state of cutting the power transmission, said power transmission device including a transmission having a gear position for cutting power transmission and an automatic clutch mechanism connected at a speed equal to or higher than a predetermined power transmission start rotational speed, and is provided between a crankshaft of said internal combustion engine and drive wheels of said vehicle;

said vehicle driven by said internal combustion engine comprising:

a power supply unit that uses a generator driven by said internal combustion engine as a power source to supply electric power to a load;

an actuator that operates a valve that adjusts an intake air amount of said internal combustion engine;

mode selection means for selecting a control mode of said internal combustion engine between a vehicle driving mode and a generating mode; and a generation control unit having speed control means which controls the intake air amount of said internal combustion engine so as to rotate said internal combustion engine at a rotational speed required for supplying predetermined electric power from said power supply unit to the load when said mode selection means selects the generating mode, wherein said vehicle driven by said internal combustion engine further comprises:

rotational speed detection means for detecting the rotational speed of said internal combustion engine;

valve control means for on/off determination which controls said actuator so as to gradually increase an opening degree of said valve when said mode selection means selects the generating mode;

determination value detection means for detecting, as a determination value, a value that reflects a magnitude of a load applied on said internal combustion engine when the rotational speed of the internal combustion engine reaches said power transmission start rotational speed in a process where said valve control means for on/off determination gradually increases said valve opening degree, and then, when said valve opening degree is further increased by a set angle that is preset within a range so as not to start said vehicle; and determination means for determining that said power transmission device is in a state of cutting power transmission when it is determined from said determination value that the load applied on the internal combustion engine is less than a preset determination reference load, and determining that said power transmission device is in a state of performing the power transmission when it is determined from the determination value that the load applied on said internal combustion engine is equal to or more than said determination reference load.

* * * * *